United States Patent
Ikeda et al.

(10) Patent No.: US 8,055,011 B2
(45) Date of Patent: Nov. 8, 2011

(54) HAIR STYLE SIMULATION IMAGE CREATING METHOD

(75) Inventors: Hiroshi Ikeda, Tokyo (JP); Atsushi Nakamura, Tokyo (JP); Keiichi Moriya, Tokyo (JP)

(73) Assignee: Kao Corporation, Tokyo (JP)

( * ) Notice: Subject to any disclaimer, the term of this patent is extended or adjusted under 35 U.S.C. 154(b) by 703 days.

(21) Appl. No.: 12/282,421

(22) PCT Filed: Mar. 16, 2007

(86) PCT No.: PCT/JP2007/055339
§ 371 (c)(1),
(2), (4) Date: Sep. 10, 2008

(87) PCT Pub. No.: WO2007/108405
PCT Pub. Date: Sep. 27, 2007

(65) Prior Publication Data
US 2009/0046891 A1   Feb. 19, 2009

(30) Foreign Application Priority Data

Mar. 23, 2006   (JP) .................................. 2006-080949

(51) Int. Cl.
*G06K 9/00*   (2006.01)
(52) U.S. Cl. ...................................................... 382/100
(58) Field of Classification Search .................. 382/100, 382/115, 117, 118, 289, 294, 296, 302; 345/632, 345/419, 420; 395/135, 120
See application file for complete search history.

(56) References Cited

U.S. PATENT DOCUMENTS

| | | |
|---|---|---|
| 6,453,052 B1 | 9/2002 | Kurokawa et al. |
| 6,862,374 B1 | 3/2005 | Nagai et al. |

FOREIGN PATENT DOCUMENTS

| | | |
|---|---|---|
| JP | 8 131252 | 5/1996 |
| JP | 9 327329 | 12/1997 |
| JP | 2000 67261 | 3/2000 |
| JP | 2001 109913 | 4/2001 |
| JP | 2005 339522 | 12/2005 |
| JP | 2005 380436 | 12/2005 |

*Primary Examiner* — Samir Ahmed
*Assistant Examiner* — Atiba Fitzpatrick
(74) *Attorney, Agent, or Firm* — Oblon, Spivak, McClelland, Maier & Neustadt, L.L.P.

(57) ABSTRACT

A hairstyle simulation image is formed by combining a face image and a hair image such that a hair image of any hairstyle can be simply combined with the face image without impairing the naturalness of the fitted face and hair images, irrespective of whether or not a part of the face is covered with the hair. The hairstyle simulation image formed by combining the face and hair images is formed as follows. First, two eyes in the face image are detected, and a semi-oval shaped curve L0 is formed based on a facial width D0 and a line passing through the eyes (an eye line L1). The facial width D0 is obtained by multiplying the distance between the eyes by a predetermined multiplier, and the semi-oval shaped curve L0 serves as a temporary facial outline. By moving the semi-oval shaped curve L0 in the right and left directions on the face image, the left and right edges Pb and Pc of the facial outline of the face image are detected based on the degree of overlap between the semi-oval shaped curve L0 and an edge line La of the jaw portion of the face image. The left and right edges Pb and Pc of the outline of the hair image are also detected as in the above. The widths $D1_f$ and $D1_h$ between the left and right edges Pb and Pc of the facial outlines of the face and hair images, respectively, are adjusted to the same width, and then the face and hair images are combined with each other.

10 Claims, 8 Drawing Sheets

Left edge portion　Central portion　Right edge portion

HAIR STYLE SIMULATION IMAGE CREATING METHOD

TECHNICAL FIELD

The present invention relates to a method and a system for forming a hairstyle simulation image by combining a face image and a hair image.

BACKGROUND ART

In order to allow a general customer to judge in advance whether a hairstyle will suit the customer without actually changing the current hairstyle, a hairstyle simulation image is formed by combining the face image of the customer and a hair image of the hairstyle designated by the customer. Conventionally, to form such a hairstyle simulation image, an operator manually adjusts the sizes and the positions of the face and hair images to be superposed.

However, with such a method, it is not possible to provide the hairstyle simulation image to the customer in a short period of time, so that in practice the customer cannot try different hairstyles at a hair salon or the like. In addition, it is difficult to deal with all requests to form hairstyle simulation images when the number of the requests is large.

In view of the above, a method has been proposed which includes: automatically extracting a facial region from a face image; determining the maximum width of the outline of the facial region, the maximum width being used as the facial width of the face image; and automatically fitting a hair image to the face image by matching the facial widths of the hair and face images with each other (Patent Document 1). In this method, the facial width is used as the basis of the fitting process. However, the facial width of an image of a single person can differ depending on whether or not the hair partially covers the face. Therefore, an unnatural hairstyle simulation image can be formed in which the hair and face images do not fit well with each other.

[Patent Document 1] JP-A-1997-131252.

DISCLOSURE OF THE INVENTION

Problems to be Solved by the Invention

In view of the foregoing problems in the conventional technology, it is an object of the present invention to form a hairstyle simulation image by combining a face image and a hair image such that a hair image of any hairstyle can be simply and automatically combined with a face image of any hairstyle while the naturalness of the fitted hair and face images is prevented from being impaired, irrespective of whether or not the hair partially covers the face.

Means for Solving the Problems

The present inventors have found the following:

(1) A semi-oval shaped curve can fit the outline of substantially the entire lower half portion of a face. Therefore, even when the outline of the upper face, excluding a jaw portion, in a face image is hidden by the hair, the outline can be estimated using a semi-oval shaped curve by fitting the semi-oval shaped curve to the outline of the jaw portion in the face image.

(2) In an image of a face with a particular hairstyle, it is difficult to estimate the position of the vertex (i.e. the top of the outline of the skull). However, there exists a specific relationship among the width between the left and right edges of a facial outline determined by using a semi-oval shaped curve, the distance between the lower edge of the facial outline and an eye line, and the distance between the eye line and the vertex.

(3) Therefore, when the face image of a subject is combined with a hair image selected according to the preference and the like of the subject, a semi-oval shaped curve serving as a temporary facial outline is formed for each of the face image of the subject and an original face image of the selected hair image. By fitting each semi-oval shaped curve to the edge line of the jaw portion not covered with the hair, the left and right edges of the facial outline are determined. Then, the width between the left and right edges of the face image of the subject is matched with that of the selected hair image. In this manner, the hair image naturally fits the face image irrespective of whether or not the face is partially covered with the hair.

(4) In addition, the lower edge of the facial outline is also determined using each semi-oval shaped curve. Furthermore, the position of the vertex is estimated using a specific relational equation. A size adjustment rectangle used for adjusting the sizes of the face and hair images is formed based on the thus-obtained lower edge, left and right edges, and vertex of the facial outline. In addition, as in the size adjustment rectangle for the face image of the subject, a size adjustment rectangle for the selected hair image is formed from the original face image of the selected hair image. Then, the aspect ratio of the size adjustment rectangle for the hair image is adjusted to the aspect ratio of the size adjustment rectangle for the face image of the subject. In this manner, the hair image naturally fits the selected face image even when the outer shapes of the face image of the subject and the original face image of the selected hair image are greatly different, i.e. one is a vertically elongated shape and the other is a circular shape.

Accordingly, the present invention provides a method for forming a hairstyle simulation image by combining a face image of a subject and a selected hair image, the method including:

detecting both eyes in the face image of the subject;

forming a semi-oval shaped curve based on a facial width and a line passing through the eyes (hereinbelow referred to as an eye line), the facial width being obtained by multiplying a distance between the eyes by a predetermined multiplier, the semi-oval shaped curve serving as a temporary facial outline below the eye line;

detecting left and right edges of a facial outline of the face image by moving the semi-oval shaped curve in left and right directions on the face image to obtain a position of the semi-oval shaped curve which gives a maximum value of the degree of overlap between the semi-oval shaped curve and an edge line of a jaw portion in the face image, and determining left and right edges of the semi-oval shaped curve located at the obtained position, the determined left and right edges of the semi-oval shaped curve being used as the left and right edges of the facial outline of the face image;

detecting left and right edges of a facial outline of an original face image of the selected hair image in a manner similar to that for the face image of the subject; and combining the face image of the subject and the selected hair image by homothetically enlarging or reducing the face image of the subject or the selected hair image such that the left and right edges of the facial outline of the face image match the left and right edges of the facial outline of the selected hair image, respectively.

The present invention also provides a system for forming a hairstyle simulation image, including a computing unit which automatically combines an inputted face image and a selected hair image and a display which displays, simultaneously or selectively, at least one of the face image, the hair image, and the simulation image, wherein the computing unit includes:

a function of detecting both eyes in the inputted face image or an original face image of the selected hair image;

a function of measuring a distance between the eyes and of computing a facial width by multiplying the measured distance by a predetermined multiplier;

a function of producing a semi-oval shaped curve based on the facial width and a line passing through the eyes (an eye line);

a function of detecting edge lines in the face images;

a function of detecting left and right edges of a facial outline of a face image by moving a semi-oval shaped curve in left and right directions on the face image to obtain a position of the semi-oval shaped curve which gives a maximum value of the degree of overlap between the semi-oval shaped curve and an edge line of a jaw portion in the face image, and determining left and right edges of the semi-oval shaped curve located at the obtained position, the determined left and right edges of the semi-oval shaped curve being used as the left and right edges of the facial outline of the face image;

a function of matching a width between the left and right edges of the facial outline of the inputted face image with the left and right edges of the facial outline of the selected hair image by homothetically enlarging or reducing the inputted face image or the selected hair image; and a function of combining the inputted face image and the selected hair image.

EFFECTS OF THE INVENTION

In the hairstyle simulation image forming method of the present invention, the left and right edges of the facial outline of each of a face image of a subject and a hair image selected according to the preference and the like of the subject are detected by using a semi-oval shaped curve. Therefore, the width between the left and right edges of the facial outline of each of the face and hair images can be obtained irrespective of whether or not a part of the face is covered with the hair, and the widths between the left and right edges of the face and hair images can be adjusted to the same width. Accordingly, a hair image of any hairstyle can be combined with the face image of any subject without impairing the naturalness of the fitted hair and face images irrespective of whether or not a part of the face is covered with the hair. In addition, the face and hair images can be simply combined with each other without requiring manual fitting operation by an operator.

Moreover, in the hairstyle simulation image forming method of the present invention, for each of the face image of the subject and the selected image, the lower edge, in addition to the left and right edges of the facial outline, is detected by using a semi-oval shaped curve. Moreover, the position of the vertex is estimated by using a specific relational equation, and a rectangle for size adjustment is formed using the above results. By using the rectangles for size adjustment, the aspect ratio of the hair image can be matched with the aspect ratio of the face image. Accordingly, the hair image can naturally fit the selected face image even when the outer shapes of the face image of the subject and the original face image of the selected hair image are greatly different, i.e., one is a vertically elongated shape and the other is a circular shape.

Furthermore, in the hairstyle simulation image system of the present invention, the hairstyle simulation image forming method of the present invention can be performed automatically in the computing unit. Therefore, a large number of hairstyle simulation images can be formed in a short period of time. For example, even when a large number of requests to form hairstyle simulation images are sent from a large number of clients through the Internet, a hairstyle simulation image can be provided to each of the clients.

Figure 10:
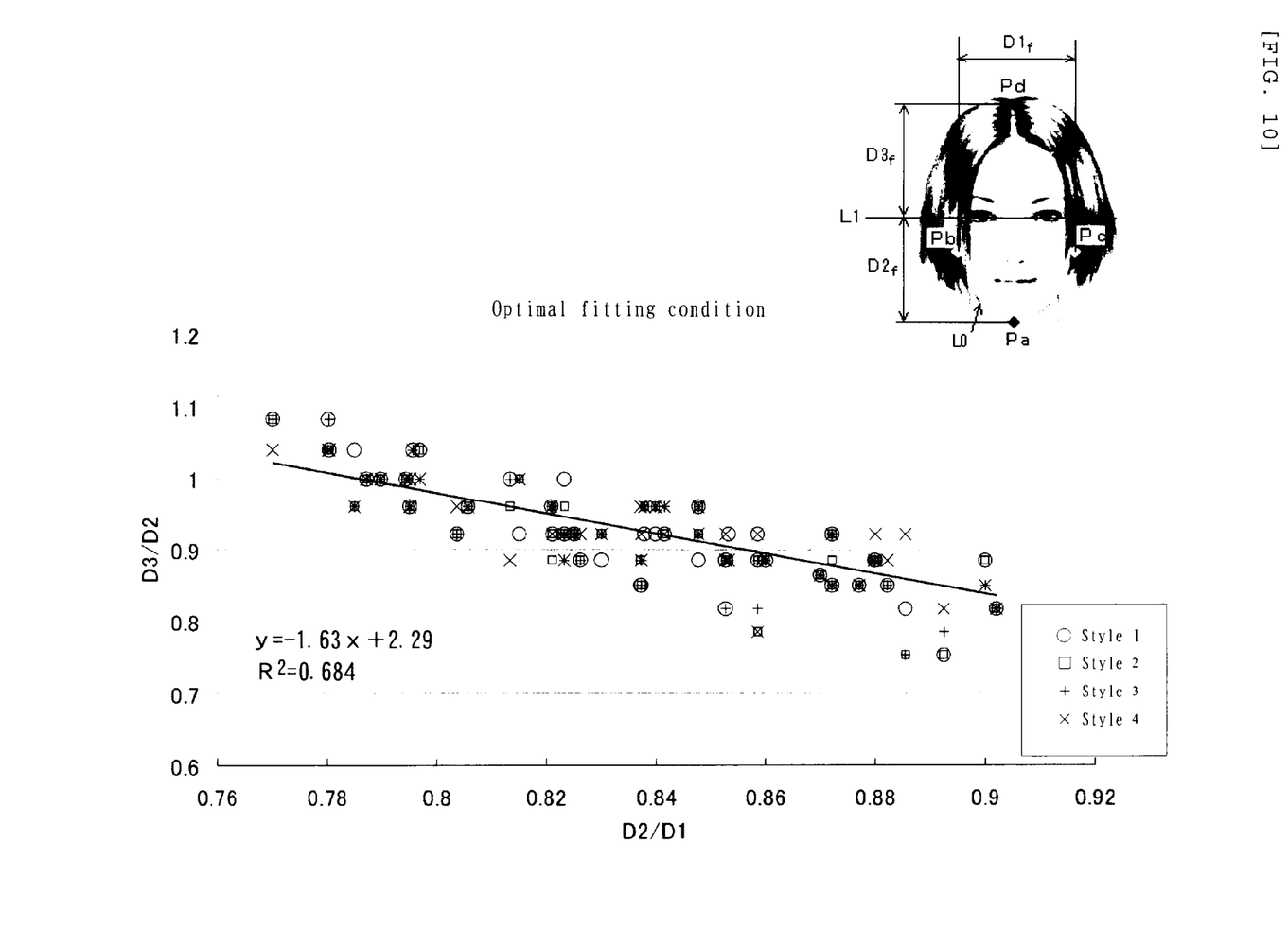
FIG. 10 is a graph showing the relationship among the width D1 between the left and right edges Pb and Pc of a facial outline, the distance D2 between the lower edge Pa of the facial outline and an eye line L1, and the distance D3 between the eye line L1 and a vertex Pd.

DESCRIPTION OF REFERENCE NUMERALS 1 personal computer
2 display
3 digital camera
4 image scanner
5 printer
10 hairstyle simulation image forming system
20 rectangle for adjusting the size of a face image
21 rectangle for adjusting the size of a hair image
D0 facial width
D1 width between left and right edges Pb and Pc of a facial outline
D2 distance between the lower edge of a facial outline and an eye line L1
D3 distance between the eye line L1 and the vertex of a face image
$D1_f$ width between the left and right edges Pb and Pc of the facial outline of the face image of a subject
$D2_f$ distance between the lower edge of the facial outline and the eye line L1 of the face image of the subject
$D3_f$ distance between the eye line L1 and the vertex Pd of the face image of the subject, the distance being estimated using the relationship shown in FIG. 10
$D1_h$ width between the left and right edges Pb and Pc of the facial outline of an original face image of a hair image
$D2_h$ distance between the lower edge of the facial outline and the eye line L1 of the original face image of the hair image $D3_n$ distance between the eye line L1 and the vertex Pd of the original face image of the hair image, the distance being set to an arbitrary value
    D4 separation distance between outside shape lines L3
    L0 semi-oval shaped curve
    L1 eye line
    L2 facial width line
    L3 outside shape line
    L4 temporary jaw line
    Pa lower edge of a facial outline
    Pb left edge of the facial outline
    Pc right edge of the facial outline
    Pd vertex

BEST MODE FOR CARRYING OUT THE INVENTION

Hereinbelow, the present invention will be described in detail with reference to the drawings. In each of the drawings, the same reference numerals designate the same or similar components.

Figure 1:
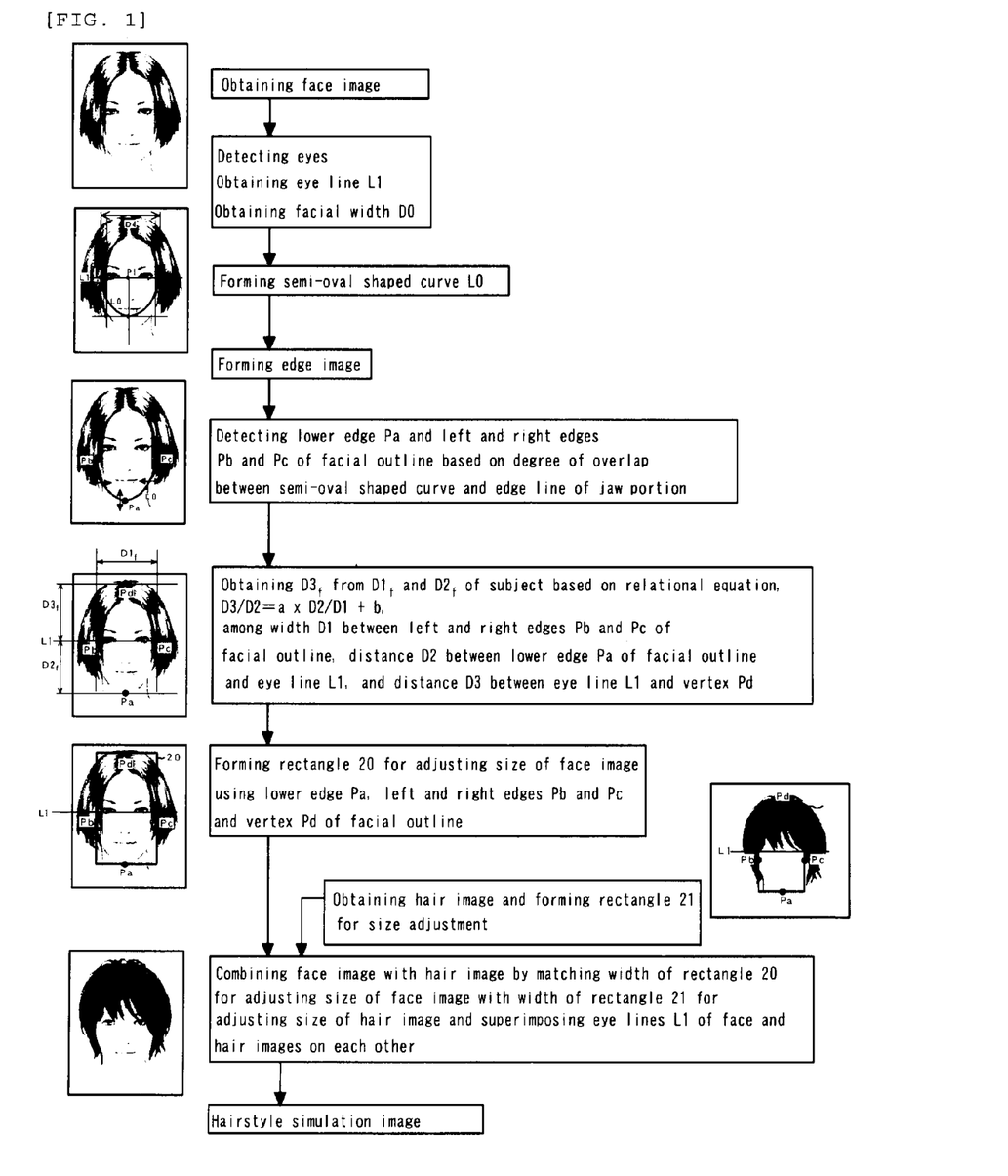
FIG. 1 is a flowchart showing a method for forming a hairstyle simulation image.
Figure 2:
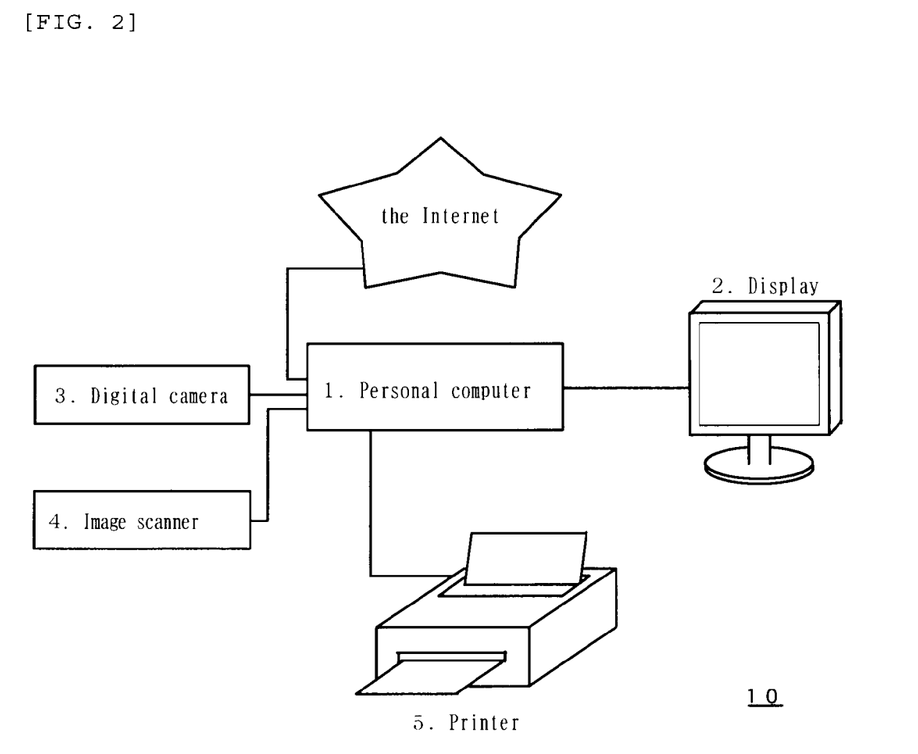
FIG. 2 is a block diagram of a hairstyle simulation image forming system.

FIG. 1 is a flowchart showing one embodiment of a hairstyle simulation image forming method of the present invention in which a hairstyle simulation image is formed by combining a face image and a hair image. FIG. 2 is a block diagram of a hairstyle simulation image forming system 10 for performing the method.

The system 10 includes a personal computer 1 and a display 2, and a digital camera 3, an image scanner 4, a printer 5, and the like are connected to the personal computer 1.

The personal computer 1 serves as a computing unit for automatically combining a face image and a hair image. This personal computer 1 includes: a function of extracting a region having a specific color from an image and measuring the size of the extracted region; a function of drawing a predetermined linear or curved pattern; a function of forming an edge image; a function of detecting an edge line; a function of moving an image or a drawn pattern; a function of enlarging and reducing an image or a drawn pattern; a function of measuring the degree of overlap between images or drawn patterns; a function of combining images; and the like. The personal computer 1 further includes functions used for forming a hairstyle simulation image in the present invention. Note that the image processing functions such as the function of extracting a region having a specific color, the function of measuring the size of the extracted region, the function of drawing a predetermined linear or curved pattern, the function of forming an edge image, the function of detecting an edge line, the function of moving an image or a drawn pattern, the function of enlarging and reducing an image or a drawn pattern, the function of measuring the degree of overlap between images or drawn patterns, and the function of combining images can be obtained by installing commercial image processing software such as Photoshop (product of Adobe Systems Incorporated) on the personal computer 1.

The display 2 displays, simultaneously or selectively, at least one of the face and hair images stored in the personal computer 1 and a simulation image formed by combining the face and hair images.

In the hairstyle simulation image forming method shown in FIG. 1, first, a face image of a subject is captured in the personal computer 1. For example, the face image may be captured by taking the face image of a subject using the digital camera 3 and sending the image to the personal computer 1, by reading a photograph of the face of a subject using the image scanner 4, or by using a communication line such as the Internet. In this case, a front view of the face is preferably used as the face image in order to increase the processing speed of combining the face and hair images.

Figure 3:
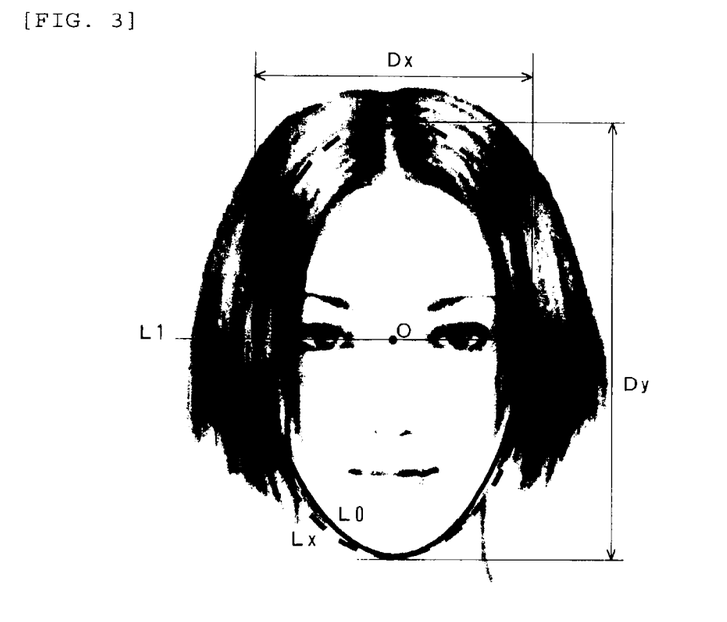
FIG. 3 is a diagram illustrating a semi-oval curve.

Next, a semi-oval shaped curve L0 serving as a temporary outline of the lower half of the face is formed under a reference line (eye line L1) passing through the eyes and extending across the facial width of the face image. As shown in FIG. 3, the semi-oval shaped curve L0 is a curve (solid line) that has a lower edge portion slightly narrower than the corresponding portion of an ellipse (broken line) Lx having a predetermined minor axis Dx and a predetermined major axis Dy with the center O at the midpoint between the eyes. The minor axis Dx and the major axis Dy may be the same, i.e., the face may be a circle. The semi-oval shaped curve L0 fits the lower part (below the eye line L1) of the facial outline better than the ellipse Lx. The semi-oval shaped curve L0 is uniquely defined when the eyes are detected and the eye line L1 and the facial width are obtained and therefore can be automatically drawn. Moreover, by fitting the semi-oval shaped curve L0 to the outline of the jaw portion that appears in the face image, the shape of the facial outline that is hidden by the hair and does not appear in the image can be reasonably estimated.

Figure 4:
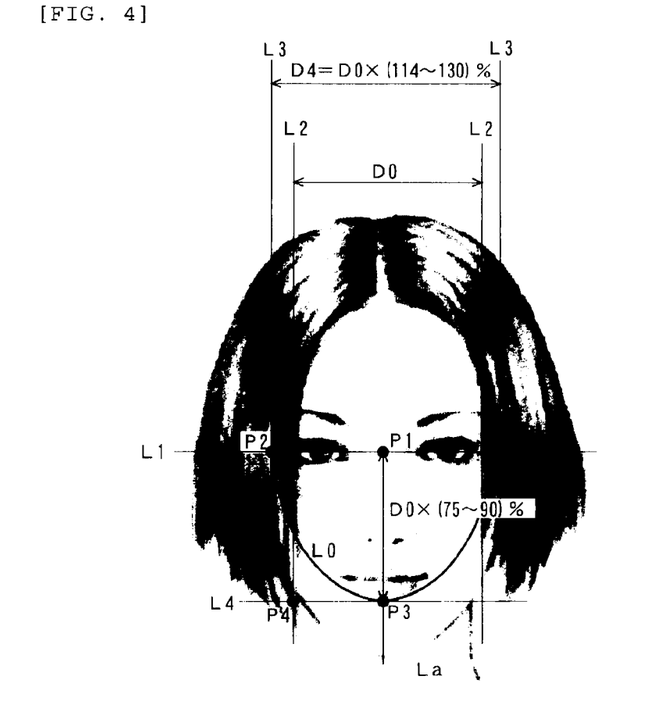
FIG. 4 is a diagram illustrating a method for forming the semi-oval shaped curve in the method for forming a hairstyle simulation image.

A specific method for forming the semi-oval shaped curve L0 is as follows. For example, as shown in FIG. 4, the positions of the eyes, preferably the midpoint P1 of the pupils of the eyes, are first detected, and a line passing through the eyes is drawn as the eye line L1. Examples of the method for detecting the eyes include a method based on edge detection, a method based on template matching, a method in which the positions of the eyes are detected after the midpoint of the eyebrows are detected, and a method disclosed in JP Appln. No. 2005-380436.

Next, the separation distance between the eyes, preferably the separation distance between the pupils of the eyes, is measured, and a value obtained by multiplying the separation distance by a predetermined coefficient is used as a facial width D0. The coefficient multiplied by the separation distance between the eyes in order to compute the facial width D0 is empirically determined, and a value from 1.75 to 2.00 can be used as the coefficient.

Two lines serving as facial width lines L2 are drawn so as to be orthogonal to the eye line L1 and separated by the facial width D0. Moreover, lines serving as outside shape lines L3 are drawn so as to be parallel to the facial width lines L2, each of the drawn lines being spaced outwardly from a corresponding one of the facial width lines L2 by a distance obtained by multiplying the facial width D0 by a predetermined coefficient. Normally, this coefficient is determined within the range of 7 to 15%. Accordingly, the separation distance D4 between the outside shape lines L3 is D0×(114 to 130) %.

In addition, a line serving as a temporary jaw line L4 is drawn so as to be parallel to the eye line L1 and spaced apart downwardly from the eye line L1 by a distance obtained by multiplying the facial width D0 by a predetermined coefficient. Normally, this coefficient is determined within the range of 75 to 90%.

A Bezier curve is drawn between a starting point P2 and an end point P3 with a control point P4. Here, the starting point P2 is the intersection between the eye line L1 and the outside shape lines L3, the end point P3 is the intersection between the temporary jaw line L4 and a line that is orthogonal to the temporary jaw line L4 and passes through the midpoint P1 of the eyes, and the control point P4 is the intersection between the facial width line L2 and the temporary jaw line L4. This Bezier curve is used as the semi-oval shaped curve L0. In addition to the above method, the semi-oval shaped curve L0 may be formed using a spline curve with a differently defined control point.

Figure 5:
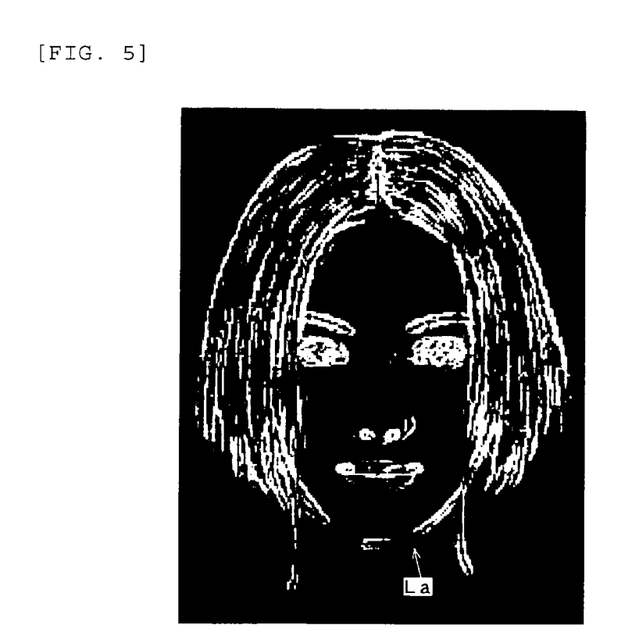
FIG. 5 is an edge image of a face image.

Normally, the outline of the jaw portion appears in the face image irrespective of the hairstyle, and the outline of the part appearing in the face image is captured. Preferably, as shown in FIG. 5, an edge image is formed from the obtained face image, and a jaw edge line La of the jaw portion is captured.

Preferably, in order to first obtain the lower edge of the outline of the face, the semi-oval shaped curve L0 is moved in the upward and downward directions on the face image, and a position of the semi-oval shaped curve L0 is determined which gives the maximum value of the degree of overlap between the semi-oval shaped curve L0 and the jaw edge line La. Then, the lower edge portion of the semi-oval shaped curve L0 located at the determined position is detected as the lower edge (i.e., the lowermost edge portion of the jaw portion) Pa of the facial outline. In the edge image of the face image, the edge line of the jaw portion can be partially unclear in some cases. However, by means of the above method, even when the lowermost edge portion of the jaw portion is unclear in the edge image of the face image, the position of the lower edge Pa of the facial outline can be determined by using the semi-oval shaped curve L0.

Figure 6:
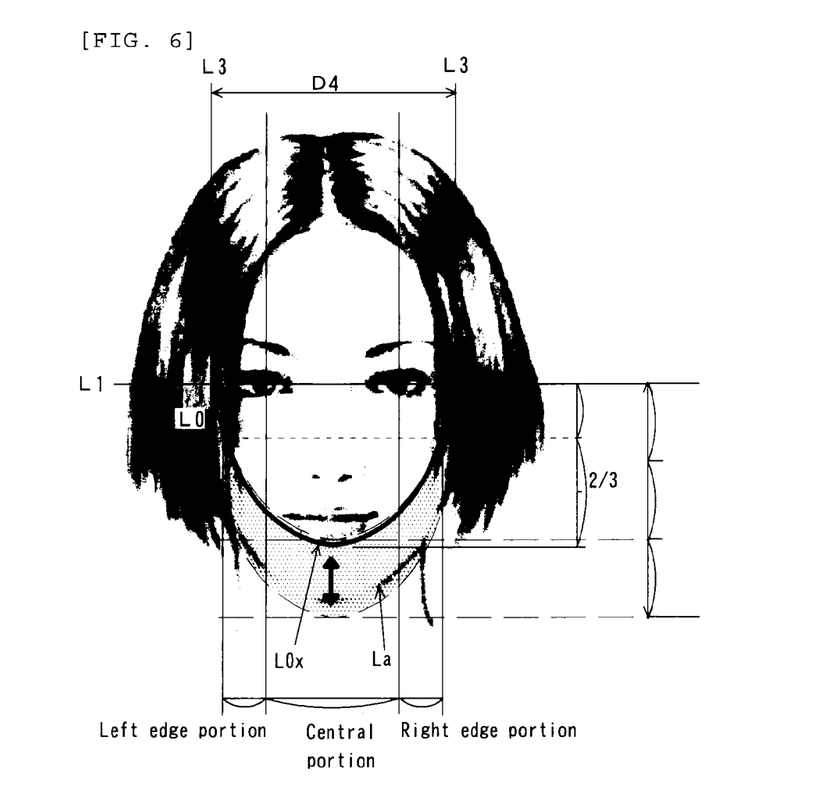
FIG. 6 is a diagram illustrating a method for obtaining a lower part of a facial outline.
Figure 7:
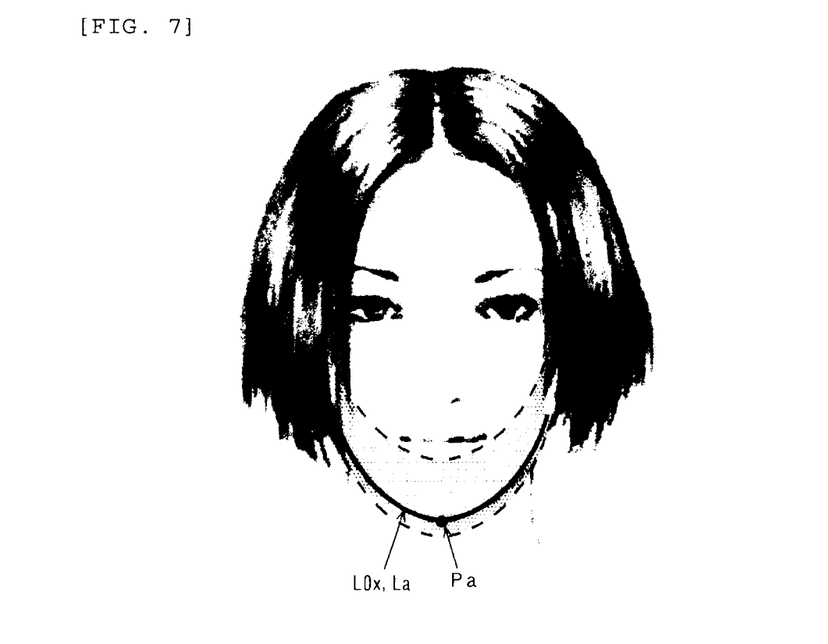
FIG. 7 is a diagram illustrating the method for obtaining the lower part of the facial outline.

For example, the position of the lower edge Pa of the facial outline is specifically determined by the following method. As shown in FIG. 6, a semi-oval shaped curve L0$x$ of the jaw portion is defined as a part of the semi-oval shaped curve L0 that extends from the lower edge of the semi-oval shaped curve L0 formed in FIG. 3 to a height of two-third of the distance between the lower edge and the eye line L1. The semi-oval shaped curve L0$x$ of the jaw portion is moved upwardly and downwardly in the dotted range shown in FIG. 6. This dotted range extends from a position spaced downwardly from the eye line L1 by ⅔ of the horizontal width of the semi-oval shaped curve L0 (i.e., the separation distance D4 between the outside shape lines L3) to a position spaced downwardly from the eye line L1 by ⅔ of the horizontal width of the semi-oval shaped curve L0. The semi-oval shaped curve L0$x$ of the jaw portion is divided into three parts, including central, left edge, and right edge portions, by lines each of which is orthogonal to the eye line L1 and passes through one of the eyes. Then, the degree of overlap between the jaw edge line La and the semi-oval shaped curve L0$x$ of the jaw portion is measured in each of the central, left edge, and right edge portions of the semi-oval shaped curve L0$x$ of the jaw portion. The position of the semi-oval shaped curve L0$x$ which gives the maximum value of the degree of overlap between the jaw edge line La and the semi-oval shaped curve L0$x$ is determined in at least the right or left edge portion of the semi-oval shaped curve L0$x$ of the jaw portion. As shown in FIG. 7, the lower edge of the semi-oval shaped curve L0$x$ located at the determined position is used as the lower edge Pa of the facial outline (i.e., the lower edge of the jaw portion).

Next, in order to obtain the left and right edges of the facial outline, the semi-oval shaped curve L0 is placed at the position used for determining the lower edge Pa of the facial outline. Then, the semi-oval shaped curve L0 is moved in the left and right directions to determine a position of the semi-oval shaped curve which gives the maximum value of the degree of overlap between the semi-oval shaped curve L0 and the jaw edge line La in the face image. The left and right edges of the semi-oval shaped curve located at the determined position are detected as the left and right edges of the facial outline. In this manner, the positions of the left and right edges Pb and Pc of the facial outline can be determined even when the cheek portions are hidden by the hair in the face image.

Figure 8:
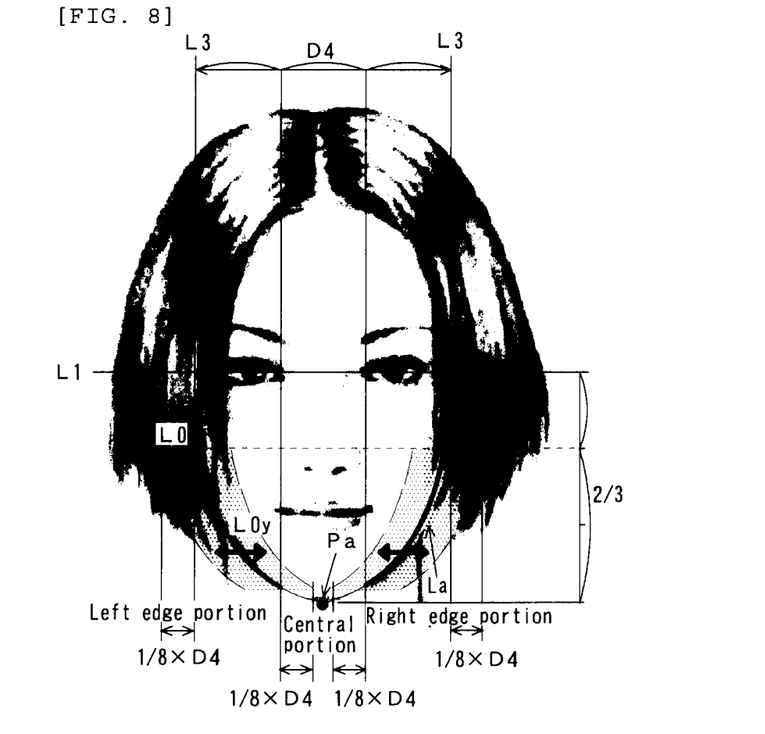
FIG. 8 is a diagram illustrating a method for obtaining the left and right edges of the facial outline.

For example, the positions of the left and right edges Pb and Pc are specifically determined by the following method. As shown in FIG. 8, the semi-oval shaped curve L0 is placed at the position for determining the lower edge Pa of the facial outline.

Figure 9:
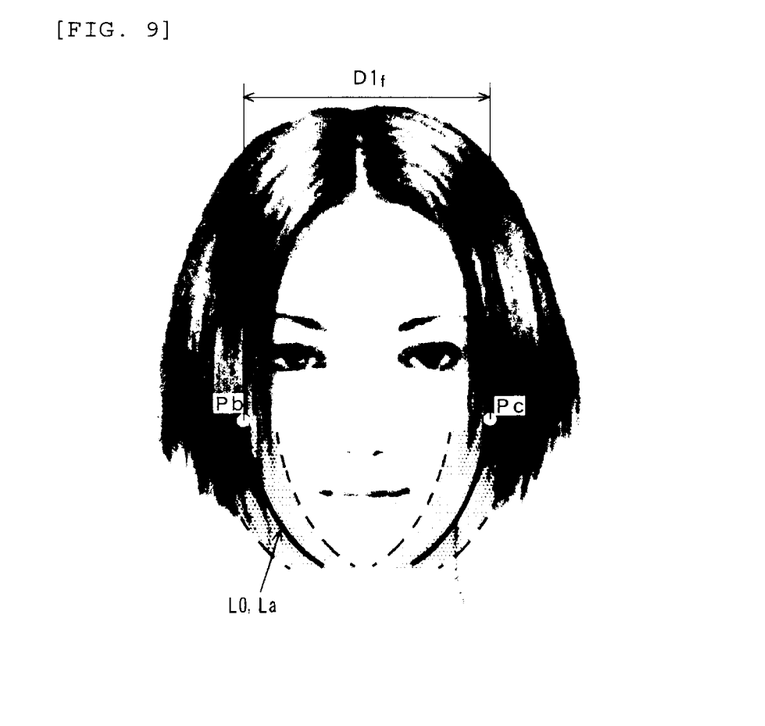
FIG. 9 is a diagram illustrating the method for obtaining the left and right edges of the facial outline.

Then, the semi-oval shaped curve L0 is trisected in the width direction into central, left edge, and right edge portions. A curve (L0$y$) extending from the lower edge Pa of the semi-oval shaped curve L0 to a height of two-third of the distance between the lower edge Pa and the eye line L1 is defined in each of the left and right edge portions. The curve (L0$y$) is moved in the left and right directions by ⅛ of the width of the semi-oval shaped curve L0 (i.e., the separation distance D4 between the outside shape lines L3). Then, a position of the semi-oval shaped curve L0 which gives the maximum value of the degree of overlap between the curve L0$y$ and the jaw edge line La is determined within the moving range (the dotted range in FIG. 8). As shown in FIG. 9, the left and right edges of the semi-oval shaped curve L0 placed at the determined position are detected as the left edge Pb and the right edge Pc, respectively, of the facial outline. Then, the width D1$_f$ between the left and right edges Pb and Pc is obtained.

When not only the lower edge Pa of the facial outline but also the left and right edges Pb and Pc are detected, it is preferable to detect the lower edge Pa first and then detect the left and right edges Pb and Pc. If the left and right edges Pb and Pc are detected first and then the lower edge Pa is detected, the lower edge Pa may not be detected easily when the face image has a shape jaw. However, by detecting the lower edge Pa first and then detecting the left and right edges Pb and Pc, such a problem can be eliminated.

Next, if necessary, the position of the vertex Pd is obtained. In order to obtain the position of the vertex Pd, a relational equation that gives a natural fitting result is determined in advance. This relational equation holds among the distance D1 between the left edge Pb and the right edge Pc of the facial outline, the distance D2 between the lower edge Pa of the facial outline and the eye line L1, and the distance D3 between the eye line L1 and the vertex Pd. The fact that a specific relational equation holds among the above distances, particularly between (D3/D2) and (D2/D1), has been found by the present inventors. Specifically, the present inventors have combined a plurality of hair images with face images of a large number of people as follows. First, for each case, the distances D1 and D2 are obtained by means of the above method, and then the distance D3 is set to an arbitrary value, and a rectangle (i.e., a rectangle for size adjustment described later) having a horizontal length of D1 and a vertical length of D2+D3 is drawn. Next, a rectangle having a horizontal length of D1$_h$ and a vertical length of D2$_h$+D3$_h$ is similarly drawn for each hair image. Then, the rectangle in the hair image is enlarged or reduced in the vertical or horizontal direction, whereby the aspect ratios of the hair and face images are adjusted to the same value. In this manner, the hair image is fitted to the face image. At this time, a value of D3 that gives the most natural fitting result is determined for each face image by trial and error. Then, the relationship between (D3/D2) and (D2/D1) is analyzed using the determined values to determine the above-mentioned relational equation. In the above process, values obtained by determining the position of the vertex Pd by a specialized hairstylist have been used as D3$_h$ of the hair images.

Specific examples of the relational equation between (D3/D2) and (D2/D1) include the following equation (1):

$$D3/D2 = a \times D2/D1 + b. \tag{1}$$

Here, a and b are each a coefficient.

When the lengths of the hair in hair images are distributed in a wide range from a short length (the bottom of the hair reaches the vicinity of the jaw) to a long length (the bottom of the hair reaches below the armpit), each of the coefficients a and b in the equation (1) may take a different value depending of the hairstyle. For example, when the lengths of the hair fall within the range from a medium length (the bottom of the hair reaches the vicinity of the collarbone) to a semi-long length (the bottom of the hair reaches the vicinity of the armpit), the analysis of the fitting results of the face images of 50 subjects and four different types of hair images (hairstyles 1 to 4) gives a=−1.63 and b=2.29, as shown in FIG. 10.

For each of the four types of hair images used for obtaining the equation (1) in FIG. 10, the value of the vertex Pd of the original face image was determined by a specialized hairstylist, and $D2_h:D3_h$ was set to 51:49 for each type. In this manner, the rectangle used for adjusting the aspect ratios to the same value can be drawn. Even when the same value is used as the ratio $D2_h:D3_h$ for each type, a strong correlation is found between (D3/D2) and (D2/D1) as shown in FIG. 10. Therefore, with hair images used as ordinary hair samples, a coefficient ratio may be used as $D2_h:D3_h$ irrespective of the hairstyles.

When a different ratio is used as $D2_h:D3_h$ for the original face images of the hair images, the coefficients a and b that give natural fitting results when the hair images are combined with the hair images of the subjects may be varied. Therefore, values obtained by analyzing each ratio $D2_h:D3_h$ of the original face images of the hair images are used as the coefficients a and b. However, for hair images generally used as hair samples, the ratio $D2_h:D3_h$ may be set within the range of 45:55 to 57:43 irrespective of the hairstyles, and the coefficients a and b corresponding to the set ratio may be used.

After the relational equation between (D3/D2) and (D2/D1) is obtained as described above, the distance $D3_f$ between the eye line L1 and the vertex Pd for a subject is computed from the relational equation using the distance $D1_f$ between the left edge Pb and the right edge Pc of the facial outline and the distance $D2_f$ between the eye line L1 and the lower edge Pa of the semi-oval shaped curve. Then, the position of the vertex Pd is obtained using the obtained distance $D3_f$.

Figure 11:
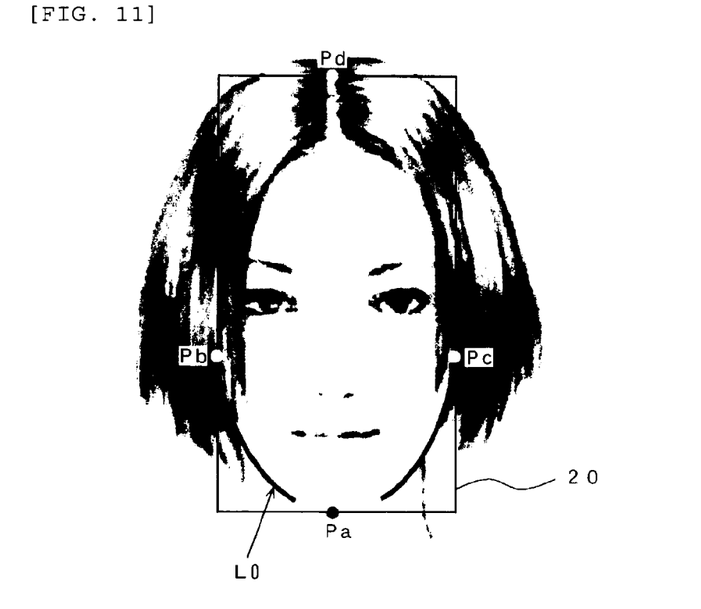
FIG. 11 is a diagram illustrating a rectangle for adjusting the size of the face image.

Next, as shown in FIG. 11, a rectangle serving as a rectangle 20 for adjusting the size of the face image is formed which has a lower edge including the lower edge Pa of the facial outline, opposite left and right edges including the left and right edges Pb and Pc, respectively, and an upper edge including the vertex Pd.

A hair image selected by the subject from various hairstyle images is stored in the personal computer 1. In this case, the hair image can be obtained from any information source such as an existing hairstyle book or a portrait. Various hairstyle images used as the hair images may be stored in advance in the personal computer 1. In order to increase the processing speed of combining the face and hair images, it is preferable to use a front view of face as the original face image of each hair image.

Figure 12:
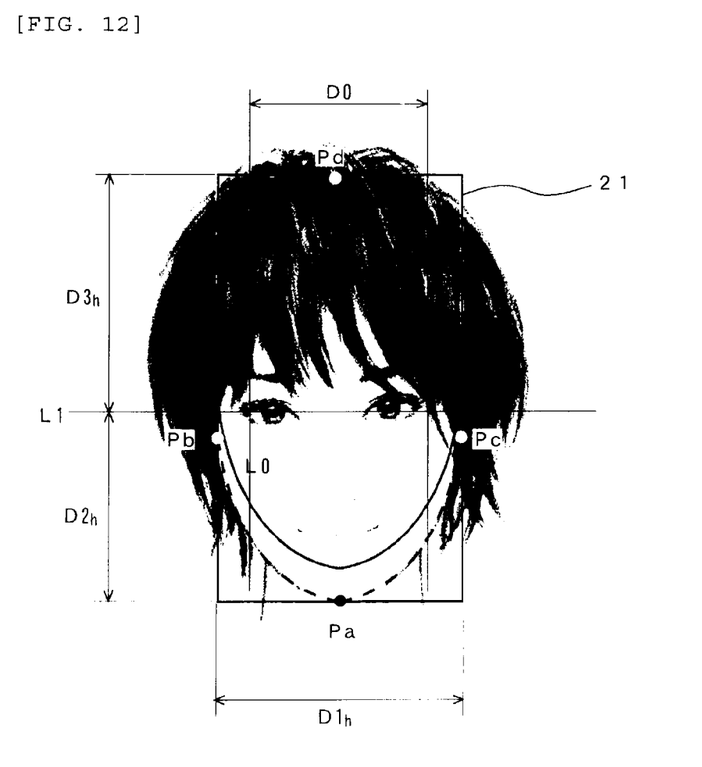
FIG. 12 is a diagram illustrating a rectangle for adjusting the size of a hair image.

For each of the hair images stored in the personal computer 1, the original face image thereof is analyzed as in the face image of the subject. Specifically, as shown in FIG. 12, the eyes are first detected, and the eye line L1 and the facial width D0 are obtained. Then, the semi-oval shaped curve L0 is formed using the above results and is fitted to the edge line of the jaw portion of the original face image, whereby the lower edge Pa and the left and right edges Pb and Pc of the facial outline are detected. Then, the width $D1_h$ between the left and right edges Pb and Pc and the distance $D2_h$ between the lower edge Pa and the eye line L1 are obtained.

The distance $D3_h$ between the eye line L1 and the vertex Pd is determined from the ratio $D2_h:D3_h$ that has been set when the equation (1) used for obtaining $D3_f$ of the face image of the subject is derived.

A rectangle 21 for size adjustment is set by using the thus-obtained width $D1_h$ between the left and right edges Pb and Pc of the hair image, the distance $D2_h$ between the lower edge Pa and the eye line L1, and the distance $D3_h$ between the eye line L1 and the vertex Pd.

Figure 13:
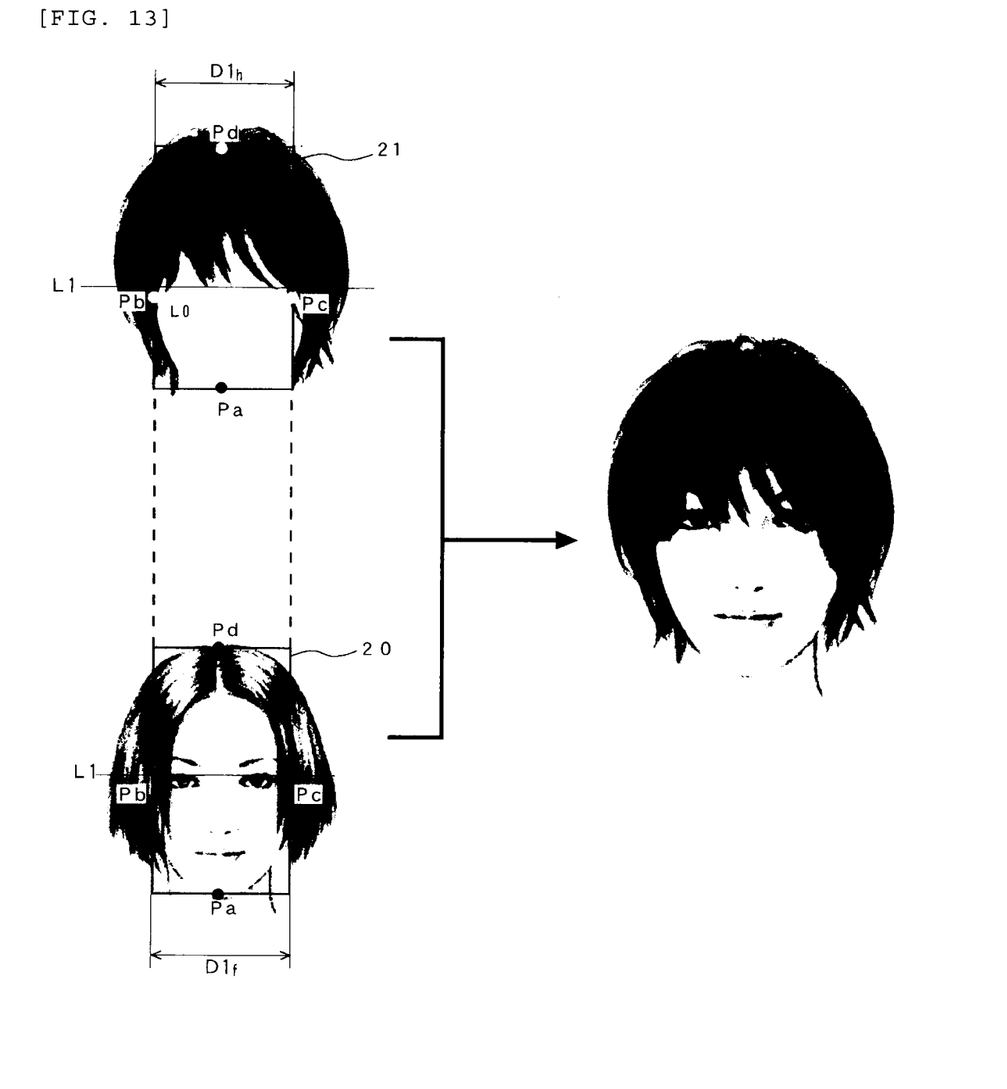
FIG. 13 is a diagram illustrating the process of combining the face image and the hair image.

Next, as shown in FIG. 13, by homothetically enlarging or reducing the hair image, the distances $D1_f$ and $D1_h$ between the left and right edges Pb and Pc of the facial outlines of the face and hair images, respectively, (or the widths of the rectangles 20 and 21 for size adjustment) are adjusted to the same value. Then, the eye lines L1 of the face and hair images are adjusted to the same position, and therefore the hair image selected by the subject is superposed on the face image of the subject, whereby a hairstyle simulation image is formed. When the images are combined with each other, the hair region in the face image of the subject is deleted in advance so that the original hair of the subject does not interfere with the hairstyle simulation image after the hair image is superposed on the face image of the subject. The hair region may be deleted by detecting the hair region by means of a known method using edge detection or the color of the hair (for example, a method disclosed in Japanese Patent Application Laid-Open No. 2005-339522) and deleting the detected hair region.

Moreover, when the hair and face images are combined with each other, the outer shapes of the face image of the subject and the original face image of the hair image may by largely different from each other, i.e., one is a vertically elongated shape and the other is a circular shape. In such a case, by enlarging or reducing the hair image in the vertical or horizontal direction, the aspect ratio of the rectangle 21 for adjusting the size of the hair image is matched with the aspect ratio of the rectangle 20 for adjusting the size of the face image of the subject. Thereafter, the widths of the rectangles 20 and 21 for adjusting the sizes of the images are adjusted to the same value, and the eye lines L1 of the face and hair images are superposed on each other to combine the face image of the subject with the selected hair image, whereby a hairstyle simulation image is formed. The above method in which the aspect ratio of the hair image is adjusted is effective for forming a natural hairstyle simulation image particularly when the value of $D2_f/D1_f$ of the face image of the subject is 0.80 or less (a horizontally elongated face) or is 0.87 or more (a vertically elongated face).

When the face and hair images are combined with each other in a simple manner without using the adjustment of the aspect ratio, it is sufficient to detect the left edge Pb and the right edge Pc of the facial outline, and the detection of the lower edge Pa and the vertex Pd can be omitted.

As has been described, according to the present invention, when a face image is combined with a hair image to form a hairstyle simulation image, a naturally fitted hairstyle simulation image can be automatically formed by once setting coefficients and the like for forming the semi-oval shaped curve without requiring discretionary judgment of an operator.

INDUSTRIAL APPLICABILITY

The present invention is useful when a hairstyle simulation image is formed by combining a face image with a hair image.

In particular, the present invention is useful when a hairstyle simulation image is automatically formed in a short period of time.

The invention claimed is:

1. A method for forming a hairstyle simulation image by combining a face image of a subject and a selected hair image, the method comprising:

detecting both eyes in the face image of the subject;

forming a semi-oval shaped curve based on a facial width and a line passing through the eyes (hereinbelow referred to as an eye line), the facial width being obtained by multiplying a distance between the eyes by a predetermined multiplier, the semi-oval shaped curve serving as a temporary facial outline below the eye line;

detecting left and right edges of a facial outline of the face image by moving the semi-oval shaped curve in left and right directions on the face image to obtain a position of the semi-oval shaped curve which gives a maximum value of the degree of overlap between the semi-oval shaped curve and an edge line of a jaw portion in the face image, and determining left and right edges of the semi-oval shaped curve located at the obtained position, the determined left and right edges of the semi-oval shaped curve being used as the left and right edges of the facial outline of the face image;

detecting left and right edges of a facial outline of an original face image of the selected hair image in a manner similar to that for the face image of the subject; and combining the face image of the subject and the selected hair image by homothetically enlarging or reducing the face image of the subject or the selected hair image such that the left and right edges of the facial outline of the face image match the left and right edges of the facial outline of the selected hair image, respectively.

2. The method for forming a hairstyle simulation image according to claim 1, further comprising:

before the left and right edges of the facial outline of the face image of the subject are detected, detecting a lower edge of the facial outline of the face image of the subject by moving the semi-oval shaped curve in upward and downward directions on the face image to obtain a position of the semi-oval shaped curve which gives a maximum value of the degree of overlap between the semi-oval shaped curve and the edge line of the jaw portion of the face image, and determining a lower edge of the semi-oval shaped curve located at the obtained position, the determined lower edge of the semi-oval shaped curve being used as the lower edge of the facial outline of the face image;

obtaining a distance $D3_f$ between the eye line and the vertex of the face image of the subject by using a width $D1_f$ between the left and right edges of the facial outline of the face image and a distance $D2_f$ between the lower edge of the semi-oval shaped curve and the eye line, based on a predetermined relational equation among a width $D1$ between the left and right edges of the facial outline of the face image, a distance $D2$ between the eye line and the lower edge of the facial outline of the face image, and a distance $D3$ between the eye line and the vertex of the face image;

forming a rectangle for adjusting the size of the face image of the subject, the rectangle having a lower edge including the lower edge of the facial outline of the face image, left and right edges including the left and right edges, respectively, of the face image, and an upper edge including the vertex of the face image;

forming a rectangle for adjusting the size of the selected hair image from the original face image of the selected hair image in a manner similar to that for the rectangle for adjusting the size of the face image of the subject;

matching an aspect ratio of the rectangle for adjusting the size of the selected hair image with an aspect ratio of the rectangle for adjusting the size of the face image of the subject by enlarging or reducing the selected hair image in a vertical or horizontal direction; and combining the face image of the subject and the selected hair image by homothetically enlarging or reducing the face image of the subject or the selected hair image such that a width of the rectangle for adjusting the size of the face image of the subject matches a width of the rectangle for adjusting the size of the selected hair image.

3. The method for forming a hairstyle simulation image according to claim 1, wherein the semi-oval shaped curve is formed by:

(1) drawing two straight lines spaced apart by the facial width (hereinafter referred to as facial width lines) so as to be orthogonal to the eye line, (2) drawing lines parallel to the facial width lines (hereinafter referred to as outer shape lines), each of the outer shape lines being located at a position outwardly spaced from a corresponding one of the facial width lines by a distance of 7 to 15% of the facial width, (3) drawing a straight line (hereinafter referred to as a temporary jaw line) parallel to the eye line, the temporary jaw line being located at a position downwardly spaced from the eye line by a distance of 75 to 90% of the facial width, and (4) drawing a Bezier curve with a starting point located at the intersection of the eye line and the outer shape line, an end point located at the intersection of the temporary jaw line and a line that is orthogonal to the eye line and passes through the midpoint of the eyes, and a control point located at the intersection of the facial width line and the temporary jaw line.

4. The method for forming a hairstyle simulation image according to claim 2, wherein the relational equation among the width $D1$ between the left and right edges of the facial outline, the distance $D2$ between the lower edge of the facial outline and the eye line, and the distance $D3$ between the eye line and the vertex is a function of $(D3/D2)$ and $(D2/D1)$.

5. A system for forming a hairstyle simulation image, comprising a computing unit which automatically combines an inputted face image and a selected hair image and a display which displays, simultaneously or selectively, at least one of the face image, the hair image, and the simulation image, wherein the computing unit includes:

a function of detecting both eyes in the inputted face image or an original face image of the selected hair image;

a function of measuring a distance between the eyes and of computing a facial width by multiplying the measured distance by a predetermined multiplier;

a function of producing a semi-oval shaped curve based on the facial width and a line passing through the eyes (an eye line);

a function of detecting edge lines in the face images;

a function of detecting left and right edges of a facial outline of a face image by moving a semi-oval shaped curve in left and right directions on the face image to obtain a position of the semi-oval shaped curve which gives a maximum value of the degree of overlap between the semi-oval shaped curve and an edge line of a jaw portion in the face image, and determining left and right edges of the semi-oval shaped curve located at the obtained position, the determined left and right edges of the semi-oval shaped curve being used as the left and right edges of the facial outline of the face image;

a function of matching a width between the left and right edges of the facial outline of the inputted face image with the left and right edges of the facial outline of the selected hair image by homothetically enlarging or reducing the inputted face image or the selected hair image; and a function of combining the inputted face image and the selected hair image.

6. The system for forming a hairstyle simulation image according to claim 5, wherein the computing unit further includes:

a function of detecting a lower edge of the facial outline of the face image by moving the semi-oval shaped curve in upward and downward directions on the face image to obtain a position of the semi-oval shaped curve which gives a maximum value of the degree of overlap between the semi-oval shaped curve and the edge line of the jaw portion of the face image, and determining a lower edge of the semi-oval shaped curve located at the obtained position, the determined lower edge of the semi-oval shaped curve being used as the lower edge of the facial outline of the face image;

a function of obtaining a distance $D3_f$ between the eye line and a vertex of the inputted face image by using a width $D1_f$ between the left and right edges of the facial outline of the inputted face image and a distance $D2_f$ between the lower edge of the semi-oval shaped curve and the eye line of the inputted face image, based on a predetermined relational equation among a width D1 between the left and right edges of the facial outline of the inputted face image, a distance D2 between the eye line and the lower edge of the facial outline of the inputted face image, and a distance D3 between the eye line and the vertex of the inputted face image;

a function of forming a rectangle for adjusting the size of the inputted face image, the rectangle having a lower edge including the lower edge of the facial outline of the inputted face image, left and right edges including the left and right edges, respectively, of the inputted face image, and an upper edge including the vertex of the inputted face image;

a function of forming a rectangle for adjusting the size of the selected hair image from the original face image of the selected hair image in a manner similar to that for the rectangle for adjusting the size of the inputted face image; and a function of matching an aspect ratio of the rectangle for adjusting the size of the selected hair image with an aspect ratio of the rectangle for adjusting the size of the inputted face image by enlarging or reducing the selected hair image in a vertical or horizontal direction.

7. The method for forming a hairstyle simulation image according to claim 2, wherein the semi-oval shaped curve is formed by:

(1) drawing two straight lines spaced apart by the facial width (hereinafter referred to as facial width lines) so as to be orthogonal to the eye line, (2) drawing lines parallel to the facial width lines (hereinafter referred to as outer shape lines), each of the outer shape lines being located at a position outwardly spaced from a corresponding one of the facial width lines by a distance of 7 to 15% of the facial width, (3) drawing a straight line (hereinafter referred to as a temporary jaw line) parallel to the eye line, the temporary jaw line being located at a position downwardly spaced from the eye line by a distance of 75 to 90% of the facial width, and (4) drawing a Bezier curve with a starting point located at the intersection of the eye line and the outer shape line, an end point located at the intersection of the temporary jaw line and a line that is orthogonal to the eye line and passes through the midpoint of the eyes, and a control point located at the intersection of the facial width line and the temporary jaw line.

8. The method for forming a hairstyle simulation image according to claim 3, wherein the relational equation among the width D1 between the left and right edges of the facial outline, the distance D2 between the lower edge of the facial outline and the eye line, and the distance D3 between the eye line and the vertex is a function of (D3/D2) and (D2/D1).

9. The method for forming a hairstyle simulation image according to claim 7, wherein the relational equation among the width D1 between the left and right edges of the facial outline, the distance D2 between the lower edge of the facial outline and the eye line, and the distance D3 between the eye line and the vertex is a function of (D3/D2) and (D2/D1).

10. A method for forming a hairstyle simulation image by combining a face image of a subject and a selected hair image, the method comprising:

detecting both eyes in the face image of the subject;

forming a semi-oval shaped curve based on a facial width and a line passing through the eyes (hereinbelow referred to as an eye line), the facial width being obtained by multiplying a distance between the eyes by a predetermined multiplier, the semi-oval shaped curve serving as a temporary facial outline below the eye line;

detecting left and right edges of a facial outline of the face image by moving the semi-oval shaped curve in left and right directions on the face image to obtain a position of the semi-oval shaped curve which gives a maximum value of the degree of overlap between the semi-oval shaped curve and an edge line of a jaw portion in the face image, and determining left and right edges of the semi-oval shaped curve located at the obtained position, the determined left and right edges of the semi-oval shaped curve being used as the left and right edges of the facial outline of the face image;

detecting left and right edges of a facial outline of an original face image of the selected hair image in a manner similar to that for the face image of the subject;

combining the face image of the subject and the selected hair image by homothetically enlarging or reducing the face image of the subject or the selected hair image such that the left and right edges of the facial outline of the face image match the left and right edges of the facial outline of the selected hair image, respectively;

before the left and right edges of the facial outline of the face image of the subject are detected, detecting a lower edge of the facial outline of the face image of the subject by moving the semi-oval shaped curve in upward and downward directions on the face image to obtain a position of the semi-oval shaped curve which gives a maximum value of the degree of overlap between the semi-oval shaped curve and the edge line of the jaw portion of the face image, and determining a lower edge of the semi-oval shaped curve located at the obtained position, the determined lower edge of the semi-oval shaped curve being used as the lower edge of the facial outline of the face image;

obtaining a distance $D3_f$ between the eye line and the vertex of the face image of the subject by using a width $D1_f$ between the left and right edges of the facial outline of the face image and a distance $D2_f$ between the lower edge of the semi-oval shaped curve and the eye line, based on a predetermined relational equation among a width D1 between the left and right edges of the facial outline of the face image, a distance D2 between the eye line and the lower edge of the facial outline of the face image, and a distance D3 between the eye line and the vertex of the face image;

forming a rectangle for adjusting the size of the face image of the subject, the rectangle having a lower edge including the lower edge of the facial outline of the face image, left and right edges including the left and right edges, respectively, of the face image, and an upper edge including the vertex of the face image;

forming a rectangle for adjusting the size of the selected hair image from the original face image of the selected hair image in a manner similar to that for the rectangle for adjusting the size of the face image of the subject;

matching an aspect ratio of the rectangle for adjusting the size of the selected hair image with an aspect ratio of the rectangle for adjusting the size of the face image of the subject by enlarging or reducing the selected hair image in a vertical or horizontal direction; and combining the face image of the subject and the selected hair image by homothetically enlarging or reducing the face image of the subject or the selected hair image such that a width of the rectangle for adjusting the size of the face image of the subject matches a width of the rectangle for adjusting the size of the selected hair image;

wherein the semi-oval shaped curve is formed by:
(1) drawing two straight lines spaced apart by the facial width (hereinafter referred to as facial width lines) so as to be orthogonal to the eye line,
(2) drawing lines parallel to the facial width lines (hereinafter referred to as outer shape lines), each of the outer shape lines being located at a position outwardly spaced from a corresponding one of the facial width lines by a distance of 7 to 15% of the facial width,
(3) drawing a straight line (hereinafter referred to as a temporary jaw line) parallel to the eye line, the temporary jaw line being located at a position downwardly spaced from the eye line by a distance of 75 to 90% of the facial width, and
(4) drawing a Bezier curve with a starting point located at the intersection of the eye line and the outer shape line, an end point located at the intersection of the temporary jaw line and a line that is orthogonal to the eye line and passes through the midpoint of the eyes, and a control point located at the intersection of the facial width line and the temporary jaw line, and wherein the relational equation among the width D1 between the left and right edges of the facial outline, the distance D2 between the lower edge of the facial outline and the eye line, and the distance D3 between the eye line and the vertex is a function of (D3/D2) and (D2/D1).

* * * * *